United States Patent
Scharl et al.

(10) Patent No.: US 9,536,434 B2
(45) Date of Patent: Jan. 3, 2017

(54) AIRCRAFT TURNS FOR INTERVAL MANAGEMENT

(71) Applicant: The Boeing Company, Chicago, IL (US)

(72) Inventors: Julien Emile Sebastien Scharl, Bothell, WA (US); David M. Myers, Marysville, WA (US); Aslaug Haraldsdottir, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 90 days.

(21) Appl. No.: 14/568,581

(22) Filed: Dec. 12, 2014

(65) Prior Publication Data

US 2016/0171895 A1 Jun. 16, 2016

(51) Int. Cl.
| | |
|---|---|
| *G01C 21/20* | (2006.01) |
| *G05D 1/08* | (2006.01) |
| *G08G 5/00* | (2006.01) |
| *G08G 5/02* | (2006.01) |
| *G05D 1/02* | (2006.01) |
| *G05D 1/10* | (2006.01) |

(52) U.S. Cl.
CPC .............. *G08G 5/0039* (2013.01); *G01C 21/20* (2013.01); *G05D 1/0202* (2013.01); *G05D 1/0808* (2013.01); *G08G 5/0021* (2013.01); *G08G 5/0047* (2013.01); *G08G 5/0052* (2013.01); *G08G 5/025* (2013.01)

(58) Field of Classification Search
CPC ..... G01C 21/20; G01C 23/005; G08G 5/0043; G08G 5/0047; G08G 5/0039; G05D 1/101; G05D 1/0202; G05D 1/0808
See application file for complete search history.

(56) References Cited

U.S. PATENT DOCUMENTS

| | | | |
|---|---|---|---|
| 7,412,324 B1* | 8/2008 | Bagge | G08G 5/025 340/948 |
| 2010/0324812 A1* | 12/2010 | Sacle | G01C 21/00 701/467 |
| 2011/0066360 A1* | 3/2011 | Haissig | G08G 5/0008 701/116 |
| 2012/0209457 A1* | 8/2012 | Bushnell | G01C 21/00 701/13 |

(Continued)

OTHER PUBLICATIONS

Abbott et al., "A Revised Trajectory Algorithm to Support En Route and Terminal Area Self-Spacing Concepts," National Aeronautics and Space Administration, NASA/CR-2010-216204, Feb. 2010, 68 pages.

*Primary Examiner* — Khoi Tran
*Assistant Examiner* — Dale Moyer
(74) *Attorney, Agent, or Firm* — Yee & Associates, P.C.

(57) ABSTRACT

A method and apparatus of turning an aircraft for interval management. Interval management information identifying a desired spacing between the aircraft and a target aircraft is received. Turn information is determined using a performance gain factor. The turn information identifies a turn point for the aircraft. The performance gain factor identifies a desired portion of achieving the desired spacing due to turning the aircraft at the turn point and a desired portion of achieving the desired spacing due to changing speed of the aircraft. The turn information is used to turn the aircraft at the turn point.

17 Claims, 9 Drawing Sheets

(56) References Cited

U.S. PATENT DOCUMENTS

| | | | |
|---|---|---|---|
| 2013/0261945 A1* | 10/2013 | Marcy | G08G 5/0008 701/121 |
| 2014/0039731 A1* | 2/2014 | Leberquer | B64C 19/00 701/3 |
| 2014/0081482 A1* | 3/2014 | Raynaud | G05D 1/12 701/3 |

* cited by examiner

AIRCRAFT TURNS FOR INTERVAL MANAGEMENT

BACKGROUND INFORMATION

1. Field

The present disclosure relates generally to defining appropriate flight paths for aircraft and controlling the movement of aircraft in flight. More particularly, the present disclosure relates to defining appropriate turns for aircraft in flight and controlling aircraft in flight to perform appropriate turns to achieve a desired spacing between aircraft in flight for interval management.

2. Background

Interval management refers to management of the spacing between aircraft in flight. Interval management may be used to organize and expedite the flow of air traffic in an effective, efficient, and reliable manner. For example, without limitation, interval management may be used to manage the spacing between aircraft approaching an airport runway for landing. A desired spacing between aircraft landing on the runway may be established to improve or optimize the efficiency of landing operations at the airport.

Interval management of aircraft in flight may be implemented by an air traffic control system or other appropriate entity. For example, an air traffic control system or other entity responsible for interval management in an area of aircraft operations may provide information for implementing interval management in the area to aircraft in flight in the area. Such interval management information may indicate, for example, a desired spacing between aircraft operating in the area. The aircraft operating in the area may be required or expected to achieve the indicated spacing between aircraft for interval management.

It thus may be desirable to control an aircraft in flight in an appropriate manner to achieve a desired spacing between the aircraft and another aircraft in flight for interval management. It also may be desirable to control an aircraft in flight in an appropriate manner to maintain or improve aircraft operating efficiency. For example, without limitation, it may be desirable to control an aircraft in flight in an appropriate manner to minimize or reduce fuel consumption by the aircraft.

Current systems and methods for controlling the movement of an aircraft in flight may not provide for maintaining or improving the operating efficiency of the aircraft while controlling the aircraft to establish a desired spacing from another aircraft for interval management. Accordingly, it would be beneficial to have a method and apparatus that take into account one or more of the issues discussed above, as well as possible other issues.

SUMMARY

The illustrative embodiments of the present disclosure provide a method of turning an aircraft for interval management. Interval management information identifying a desired spacing between the aircraft and a target aircraft is received. Turn information is determined using a performance gain factor. The turn information identifies a turn point for the aircraft. The performance gain factor identifies a desired portion of achieving the desired spacing due to turning the aircraft at the turn point and a desired portion of achieving the desired spacing due to changing speed of the aircraft. The turn information is used to turn the aircraft at the turn point.

The illustrative embodiments of the present disclosure also provide an apparatus comprising an information receiver, a turn calculator, and an information formatter. The information receiver is configured to receive interval management information identifying a desired spacing between an aircraft and a target aircraft. The turn calculator is configured to determine turn information using a performance gain factor. The turn information identifies a turn point for the aircraft. The performance gain factor identifies a desired portion of achieving the desired spacing due to turning the aircraft at the turn point and a desired portion of achieving the desired spacing due to changing speed of the aircraft. The information formatter is configured to format the turn information for using the turn information to turn the aircraft at the turn point.

The illustrative embodiments of the present disclosure also provide a method of turning an aircraft for interval management. A search goal is determined using a desired spacing between the aircraft and a target aircraft. A candidate turn point along a leg of flight of the aircraft is selected. The candidate turn point is evaluated to determine whether the candidate turn point satisfies the search goal. The candidate turn point is identified as the turn point in response to a determination that the candidate turn point satisfies the search goal. The aircraft is turned at the turn point.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Different illustrative embodiments recognize and take into account a number of different considerations. "A number," as used herein with reference to items, means one or more items. For example, "a number of different considerations" are one or more different considerations.

Different illustrative embodiments recognize and take into account that it may be desirable to control an aircraft in flight to achieve a desired spacing between the aircraft and another aircraft in flight for interval management. The desired spacing may be achieved by turning the aircraft at an appropriate turn point, by changing or otherwise controlling the speed of the aircraft, or by an appropriate combination of turning and speed control.

The different illustrative embodiments also recognize and take into account that both turning an aircraft and changing the speed of an aircraft may burn fuel or otherwise effect the efficient operation of an aircraft in various ways. Therefore, aircraft operating efficiency may be improved by taking into account the effects of both turning the aircraft and changing the speed of the aircraft in controlling the movement of the aircraft to achieve a desired spacing between aircraft for interval management.

Illustrative embodiments provide a system and method for determining a desired turn point for an aircraft that may take into account both the effect of turning the aircraft at the turn point and the effect of changing the speed of the aircraft in achieving a desired spacing between aircraft for interval management. In accordance with an illustrative embodiment, turn information for interval management of an aircraft may be determined using a performance gain factor that identifies a desired portion of achieving a desired spacing between aircraft due to turning the aircraft at a turn point and a desired portion of achieving the desired spacing between the aircraft due to changing speed of the aircraft.

Turn information generated in accordance with an illustrative embodiment may be used to turn an aircraft to achieve a desired spacing between aircraft for interval management. For example, without limitation, turn information in accordance with an illustrative embodiment may be displayed to an aircraft operator in an appropriate manner for the operator to turn the aircraft manually at a desired turn point. Alternatively, turn information in accordance with an illustrative embodiment may be manually or automatically provided to an aircraft flight management system for automated control of the aircraft turn at the turn point.

Figure 1:
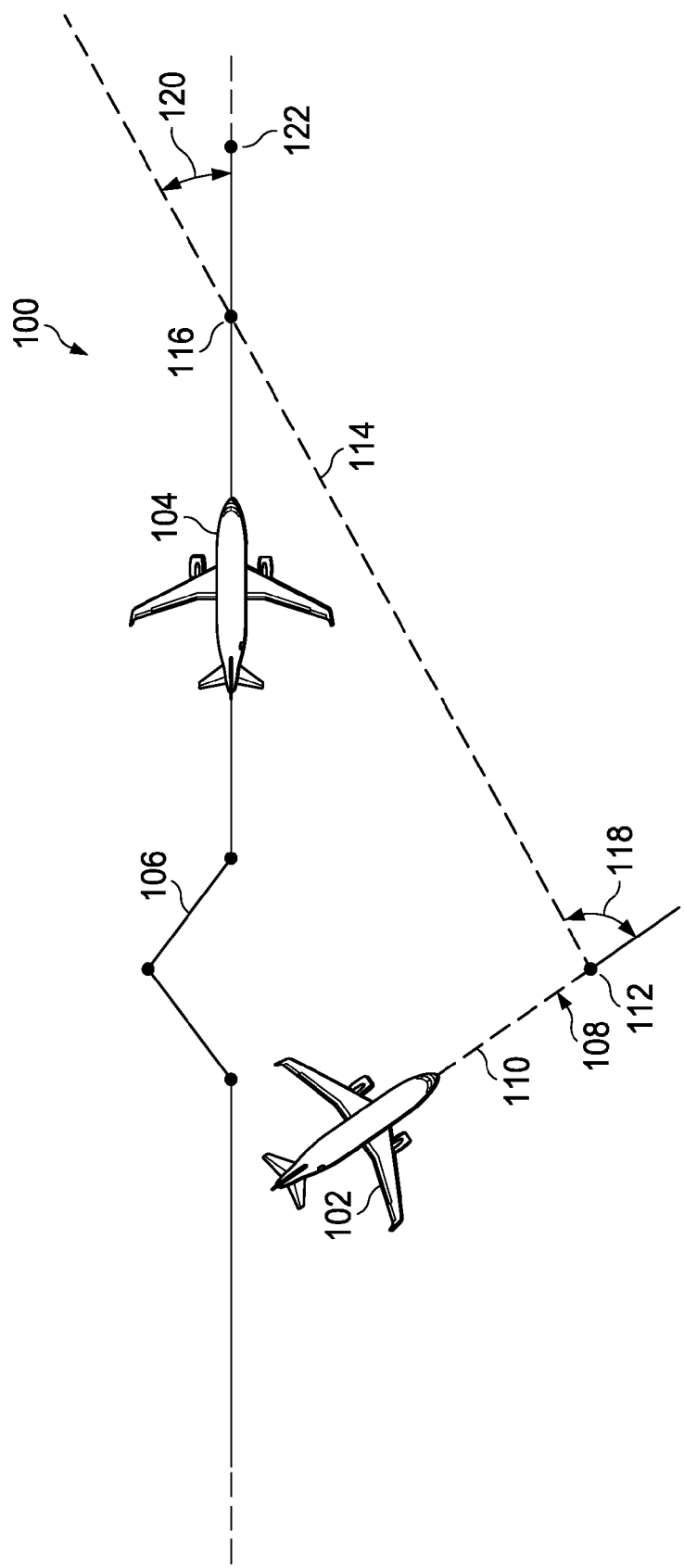
FIG. 1 is an illustration of aircraft turns for interval management in an aircraft operating environment in accordance with an illustrative embodiment.

Turning to FIG. 1, an illustration of aircraft turns for interval management in an aircraft operating environment is depicted in accordance with an illustrative embodiment. Aircraft operating environment 100 may include any appropriate airspace in which a number or aircraft may be in flight. For example, without limitation, aircraft 102 and target aircraft 104 may be in flight in aircraft operating environment 100. The symbols representing aircraft 102 and target aircraft 104 indicate the relative positions of aircraft 102 and target aircraft 104 in aircraft operating environment 100 at a point in time. The symbols representing aircraft 102 and target aircraft 104 are not necessarily drawn to scale with respect to distances in aircraft operating environment 100. More or fewer than two aircraft may be in flight in aircraft operating environment 100.

Aircraft 102 and target aircraft 104 may be commercial passenger aircraft, cargo aircraft, private or personal aviation aircraft, military aircraft, or any other appropriate type of aircraft that may be used for any appropriate purpose. Aircraft 102 and target aircraft 104 may be fixed wing, rotary wing, or lighter-than-air aircraft. Aircraft 102 and target aircraft 104 may be manned aircraft or unmanned aerial vehicles. Aircraft 102 and target aircraft 104 may be the same type of aircraft or may be different types of aircraft.

Target aircraft 104 may be in flight on and following route 106, indicated by a solid line in FIG. 1. Route 106 also may be referred to as a flight path. Route 106 may be straight or may include a number of turns at a number of points along route 106.

Aircraft 102 may be in flight on flight path 108, indicated by a broken line in FIG. 1. Flight path 108 also may be referred to as a route. Relatively straight portions of flight path 108, between turns of aircraft 102, may be referred to as legs of flight path 108. Flight path 108 for aircraft 102 may be different from route 106. For example, without limitation, leg 110 of flight path 108 for aircraft 102 may be in a direction away from route 106. Leg 110 of flight path 108 for aircraft 102 also or alternatively may be referred to as a first leg, an outbound leg, or a current leg.

It may be desirable that flight path 108 for aircraft 102 merges with and follows route 106 at some point. For example, without limitation, aircraft 102 and target aircraft 104 may be directed to land on a designated runway at an airport. Route 106 may be a preferred approach route for aircraft landing on the designated runway. In this case, it may be desirable that the flight paths of all aircraft that will be landing on the designated runway, including aircraft 102 and target aircraft 104, are merged into route 106.

To join route 106, aircraft 102 may turn at turn point 112 from leg 110 of flight path 108 onto leg 114 of flight path 108. Leg 114 of flight path 108 intersects route 106 at intercept point 116. Leg 114 of flight path 108 also or alternatively may be referred to as a second leg or an inbound leg. Aircraft 102 may turn onto route 106 at intercept point 116. Aircraft 102 may be referred to as a turning aircraft.

Turn angle 118 is the angle that aircraft 102 turns at turn point 112 from leg 110 to leg 114 of flight path 108. Turn angle 120 is the angle that aircraft 102 turns from leg 114 of flight path 108 onto route 106. It may be desirable that neither turn angle 118 nor turn angle 120 exceed a maximum turn angle for aircraft 102. The maximum turn angle for aircraft 102 may be determined in any appropriate manner. For example, the maximum turn angle for aircraft 102 may be determined so as to take into account the turning capability of aircraft 102, the efficient operation of aircraft 102, the comfort of passengers onboard aircraft 102, government regulations, other considerations, or various combinations of considerations. For example, without limitation, the maximum turn angle for aircraft 102 may be approximately 120 degrees, or another appropriate angle.

It may be desirable for aircraft 102 to achieve and maintain a desired spacing from target aircraft 104 when aircraft 102 joins target aircraft 104 on route 106. For example, without limitation, an air traffic control system or other entity may instruct aircraft 102 to achieve a desired spacing with target aircraft 104 for interval management of aircraft on route 106 or another appropriate purpose. For example, aircraft 102 may be instructed to achieve the desired spacing with target aircraft 104 by the time that aircraft 102 reaches achieve-by point 122 on route 106.

The desired spacing between aircraft 102 and target aircraft 104 for interval management may be achieved by turning aircraft 102 at the appropriate turn point 112 or by turning aircraft 102 at the appropriate turn point 112 in combination with controlling the speed of aircraft 102 in an appropriate manner. For example, turn point 112 may be selected such that when aircraft 102 turning at turn point 112 turns onto route 106 at intercept point 116, aircraft 102 is at the desired spacing with target aircraft 104 on route 106. In this case, the desired spacing between aircraft 102 and target aircraft 104 may be achieved by turning aircraft 102 at turn point 112 without changing the speed of aircraft 102. In another example, turn point 112 may be selected such that when aircraft 102 turning at turn point 112 turns onto route 106 at intercept point 116, aircraft 102 is not at the desired spacing with target aircraft 104 on route 106. In this case, the desired spacing between aircraft 102 and target aircraft 104 may be achieved by controlling the speed of aircraft 102 in an appropriate manner to achieve the desired spacing between aircraft 102 and target aircraft 104 after aircraft 102 turns onto route 106 at intercept point 116.

In accordance with an illustrative embodiment, turn point 112 may be determined in a manner that takes into account the desired portion of achieving the desired spacing between aircraft 102 and target aircraft 104 due to turning aircraft 102 at turn point 112 and the desired portion of achieving the desired spacing between aircraft 102 and target aircraft 104 due to changing the speed of aircraft 102.

Figure 2:
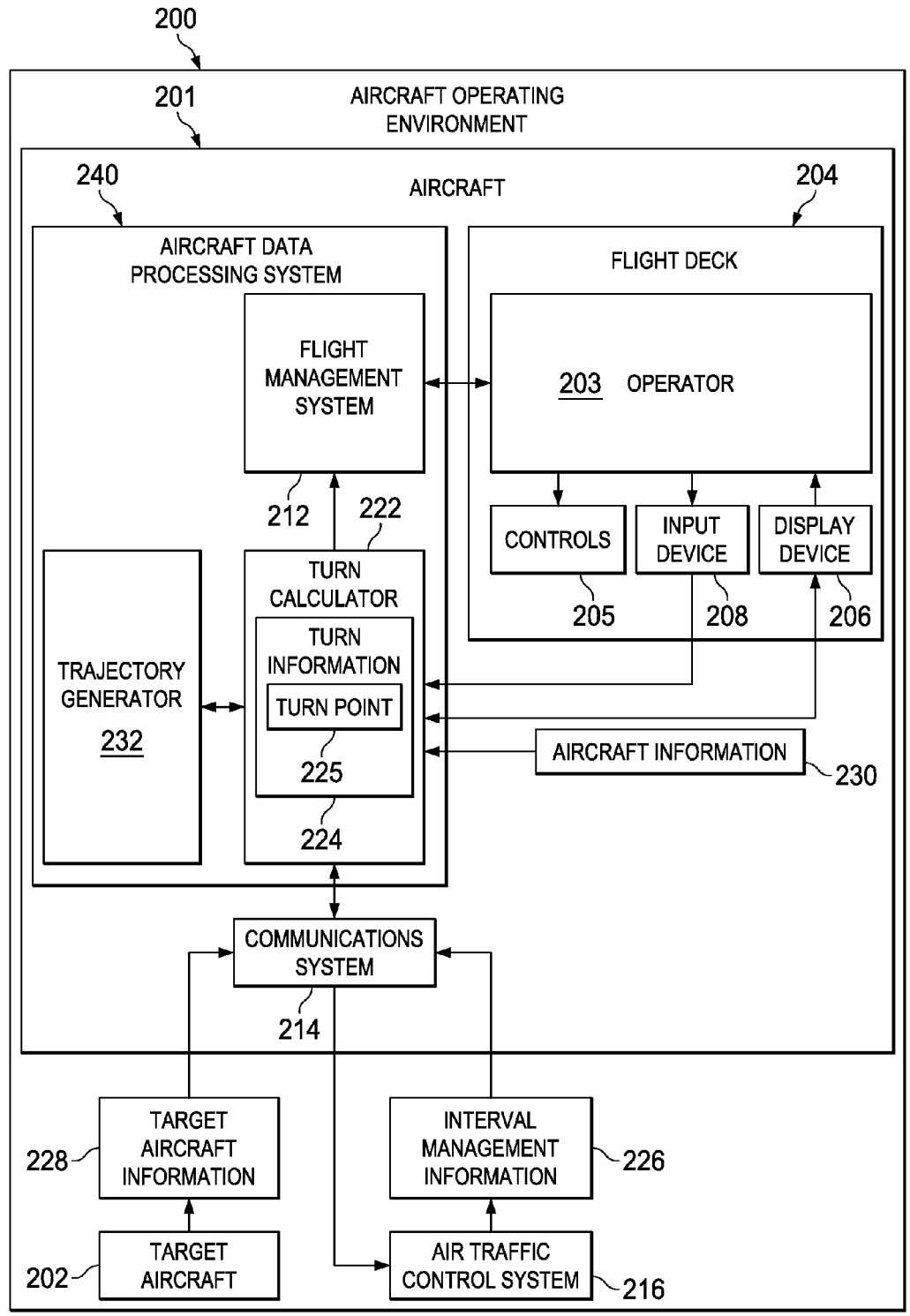
FIG. 2 is an illustration of a block diagram of an aircraft operating environment in accordance with an illustrative embodiment.

Turning to FIG. 2, an illustration of a block diagram of an aircraft operating environment is depicted in accordance with an illustrative embodiment. Aircraft operating environment 200 may be an example of one implementation of aircraft operating environment 100 in FIG. 1. Aircraft 201 and target aircraft 202 may be in flight in aircraft operating environment 200. Aircraft 201 and target aircraft 202 may be examples of implementations of aircraft 102 and target aircraft 104, respectively, in FIG. 1. More than two aircraft may be in flight in aircraft operating environment 200.

The movement of aircraft 201 while in flight in aircraft operating environment 200 may be controlled manually by operator 203. Operator 203 may be a pilot or other human operator of aircraft 201. Operator 203 may control aircraft 201 from flight deck 204 of aircraft 201 or from another appropriate location by the manipulation of appropriate controls 205. Flight deck 204 also or alternatively may be referred to as the cockpit of aircraft 201. Controls 205 may be configured to control the operation of various systems on aircraft 201. For example, without limitation, operator 203 may use controls 205 to turn aircraft 201, to change the speed of aircraft 201, or to control the movement of aircraft 201 in aircraft operating environment 200 in any other appropriate manner or in various combinations of ways.

Operator 203 may use various types of information in various ways to control the operation of aircraft 201 in an appropriate manner. Information for the control of aircraft 201 by operator 203 may be displayed to operator 203 on display device 206. Any appropriate information, from any appropriate source, may be displayed to operator 203 on display device 206 in any appropriate format. Display device 206 may include any appropriate number of display devices. Display device 206 may be implemented on aircraft 201 in any appropriate manner. For example, without limitation, display device 206 may be implemented on flight deck 204 of aircraft 201 in any appropriate manner.

Operator 203 may enter various types of information into various systems on aircraft 201 for various purposes. Information for the control of aircraft 201 or other appropriate purposes may be entered into the appropriate systems on aircraft 201 by operator 203 via input device 208. Any appropriate information may be entered in any appropriate format into any appropriate system on aircraft 201 by operator 203 via input device 208. Input device 208 may include any appropriate number of input devices. Input device 208 may be implemented on aircraft 201 in any appropriate manner. For example, without limitation, input device 208 may be implemented on flight deck 204 of aircraft 201 in any appropriate manner.

Display device 206 and input device 208 may be implemented as separate devices on aircraft 201. Alternatively, display device 206 and input device 208 may be implemented together as a single device on aircraft 201. For example, without limitation, display device 206 and input device 208 may be implemented together as a touch screen display device on aircraft 201 or in another appropriate manner.

The movement of aircraft 201 while in flight in aircraft operating environment 200 may be controlled automatically or automatically in combination with manual control of aircraft 201 by operator 203. For example, without limitation, automatic control of the movement of aircraft 201 in flight may be provided by flight management system 212 on aircraft 201 or in another appropriate manner. Flight management system 212 may comprise a specialized computer system that automates a wide variety of in-flight tasks. Flight management system 212 may be configured to perform in-flight management of a flight plan for aircraft 201. For example, without limitation, flight management system 212 may be configured to use information from various sensors to determine the position of aircraft 201 and to guide aircraft 201 along a flight plan.

Aircraft 201 may include communications system 214. Communications system 214 may include a number of appropriate systems for communicating with systems off of aircraft 201. For example, without limitation, communications system 214 may be configured for communication with air traffic control system 216 and target aircraft 202. Communications system 214 may be configured to provide voice communications, data communications other than voice communications, or both voice and other data communications.

Turn calculator 222 on aircraft 201 may be configured to generate turn information 224 for controlling turns of aircraft 201. For example, without limitation, turn calculator 222 may be configured to generate turn information 224 for controlling turns of aircraft 201 for interval management. For example, turn information 224 may identify turn point 225 at which aircraft 201 should be turned to achieve a desired spacing of aircraft 201 with target aircraft 202. Turn information 224 generated by turn calculator 222 may be used to turn aircraft 201 at turn point 225. An example of one implementation of turn calculator 222 in accordance with an illustrative embodiment is described below with reference to FIG. 3. An example of one implementation of a process for generating turn information 224 by turn calculator 222 is described below with reference to FIGS. 4-8. Turn calculator 222 may be configured to use interval management information 226, target aircraft information 228, and aircraft information 230 to generate turn information 224.

Interval management information 226 may include information that identifies a desired spacing between aircraft 201 and target aircraft 202. For example, without limitation, interval management information 226 also may include one or more of information that identifies target aircraft 202, a route for target aircraft 202, an intercept point, an achieve-by point, or any other appropriate information for use by turn calculator 222 to generate turn information 224.

Interval management information 226 may be provided to aircraft 201 by air traffic control system 216 or any other appropriate source of interval management information 226 via communications system 214. Air traffic control system 216 may comprise any system or entity with the responsibility to control air traffic in a portion of air space. For example, without limitation, air traffic control system 216 may comprise terminal control associated with an airport or other location for the take-off and landing of aircraft, an area control center for controlling aircraft in route between areas covered by terminal control, or another appropriate air traffic control system. Air traffic control system 216 may have the appropriate authority to order or request movements of aircraft 201 by providing interval management information 226 to aircraft 201.

Target aircraft information 228 may include information about target aircraft 202 used by turn calculator 222 to generate turn information 224. For example, without limitation, target aircraft information 228 may include information identifying the current state of target aircraft 202. Target aircraft information 228 identifying the current state of target aircraft 202 may include information identifying the current position of target aircraft 202 and the current speed of target aircraft 202.

Target aircraft information 228 may be provided to aircraft 201 from target aircraft 202 via communications system 214 or in another appropriate manner. For example, without limitation, target aircraft information 228 may be provided from target aircraft 202 to aircraft 201 via automatic dependent surveillance—broadcast, ADS-B. Automatic dependent surveillance—broadcast is a cooperative surveillance technology in which an aircraft determines its position via satellite navigation and periodically broadcasts it, enabling the aircraft to be tracked.

Aircraft information 230 may include information about aircraft 201 that is used by turn calculator 222 to generate turn information 224. For example, without limitation, aircraft information 230 may include information identifying the current state of aircraft 201 and a flight path for aircraft 201. Aircraft information 230 identifying the current state of aircraft 201 may include information identifying the current position of aircraft 201 and the current speed of aircraft 201 along a flight path for aircraft 201.

Aircraft information 230 may be provided by appropriates systems on aircraft 201 or in another appropriate manner. For example, without limitation, aircraft information 230 identifying the current state of aircraft 201 may be provided by flight management system 212, by a satellite based or other appropriate navigation system on aircraft 201, or by another appropriate system or combination of systems on aircraft 201.

Turn calculator 222 may use target aircraft information 228 and aircraft information 230 to predict paths of movement for target aircraft 202 and aircraft 201, respectively, to generate turn information 224. Turn calculator 222 may use trajectory generator 232 to predict the movement of aircraft 201 and target aircraft 202. Trajectory generator 232 may comprise any appropriate system or method for predicting the movement of target aircraft 202 and aircraft 201. Trajectory generator 232 may be configured to properly represent a flyable trajectory in three dimensions, including proper construction of turns and representative of the intended flight path in the vertical and longitudinal directions. For example, without limitation, the functionality of trajectory generator 232 may be implemented as part of flight management system 212. Alternatively, trajectory generator 232 may be implemented separately from flight management system 212.

Turn information 224 generated by turn calculator 222 may be used to turn aircraft 201 at turn point 225. For example, without limitation, turn information 224 may be displayed to operator 203 on display device 206 and used by operator 203 to turn aircraft 201 manually at the turn point identified in turn information 224. Alternatively, turn information 224 displayed on display device 206 may be entered by operator 201 into flight management system 212 via input device 208, or provided directly from turn calculator 222 to flight management system 212, for automatically turning aircraft 201 at turn point 225 identified in turn information 224.

One or more of flight management system 212, turn calculator 222, and trajectory generator 232 may be implemented in software or in software in combination with hardware on aircraft data processing system 240. Aircraft data processing system 240 may comprise any number of appropriate data processing systems on aircraft 201.

Figure 3:
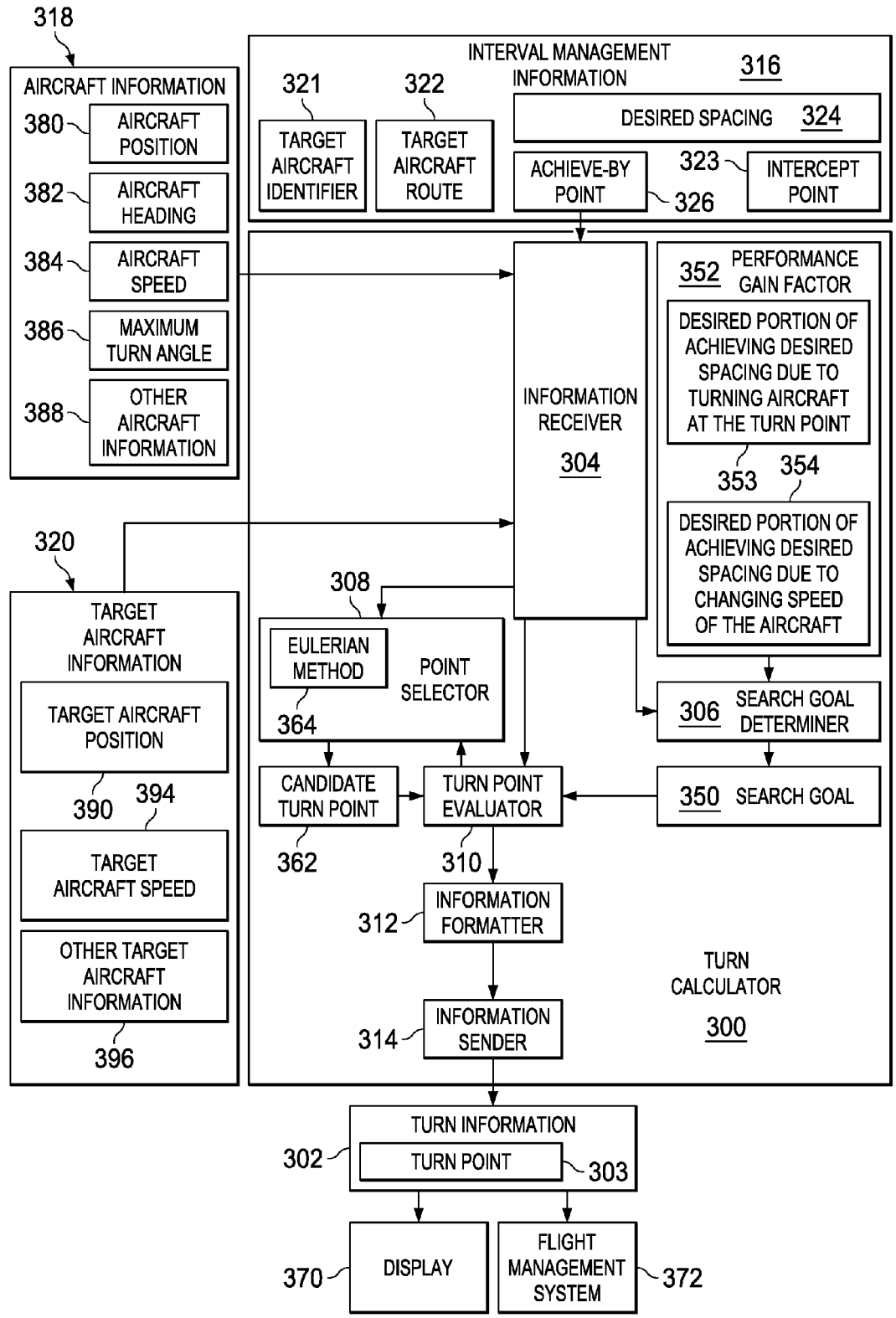
FIG. 3 is an illustration of a block diagram of a turn calculator in accordance with an illustrative embodiment.

Turning to FIG. 3, an illustration of a block diagram of a turn calculator is depicted in accordance with an illustrative embodiment. Turn calculator 300 may be an example of one implementation of turn calculator 222 in FIG. 2.

Turn calculator 300 is configured to generate turn information 302. Turn information 302 may identify turn point 303. Turn calculator 300 may comprise information receiver 304, search goal determiner 306, point selector 308, turn point evaluator 310, information formatter 312, and information sender 314.

Information receiver 304 may be configured to receive various types of information from various sources for use by turn calculator 300 to determine turn information 302. For example, without limitation, information receiver 304 may be configured to receive interval management information 316, aircraft information 318, target aircraft information 320, other appropriate information, or various combinations of information for use by turn calculator 300 to determine turn information 302.

For example, without limitation, interval management information 316 may include target aircraft identifier 321, and may identify target aircraft route 322, intercept point 323, desired spacing 324, and achieve-by point 326. Target aircraft identifier 321 may identify a target aircraft in flight in any appropriate manner. Target aircraft route 322 may be identified in any appropriate manner. Intercept point 323 may be a point on the route of the target aircraft where the turning aircraft intercepts the route and turns onto the route. Desired spacing 324 may be the desired spacing between the turning aircraft and the target aircraft on the route. Achieve-by point 326 may be the point by which desired spacing 324 between the turning aircraft and the target aircraft is to be achieved. Interval management information 316 may be received from an air traffic control system or other appropriate source of interval management information 316.

Aircraft information 318 may include, without limitation, aircraft position 380, aircraft heading 382, aircraft speed 384, maximum turn angle 386, other aircraft information 388, or various combinations of information regarding the turning aircraft. Aircraft information 318 may be provided by appropriate systems onboard the turning aircraft or in another appropriate manner.

Target aircraft information 320 may include, without limitation, target aircraft position 390, target aircraft speed 394, other target aircraft information 396, or various combinations of information regarding the target aircraft. Target aircraft information 318 may be provided by the target aircraft or in another appropriate manner.

Search goal determiner 306 may be configured to determine search goal 350 using performance gain factor 352. Performance gain factor 352 may be selected or determined to identify a desired portion of achieving desired spacing 324 due to turning the aircraft at turn point 303 and a desired portion of achieving desired spacing 324 due to changing the speed of the aircraft 354. For example, without limitation, search goal determiner 306 may be configured to determine search goal 350 by determining an estimated time of arrival of the target aircraft at achieve-by point 326. Search goal 350 then may be determined by multiplying the sum of desired spacing 324 and the estimated time of arrival of the target aircraft at achieve-by point 326 by performance gain factor 352. An example of one implementation of a process for determining search goal 350 that may be implemented by search goal determiner 306 is described below with reference to FIG. 6.

Performance gain factor 352 may be selected in advance prior to a flight, calculated in advance prior to a flight, or calculated during a flight. For example, without limitation, performance gain factor 352 may be calculated based on known current conditions of a turning aircraft and the relationship of the current conditions to the desired nominal conditions of the aircraft along a desired flight path, expectations of flight efficiencies, or both.

For example, without limitation, the value for performance gain factor 352 may be selected based on the current speed of the turning aircraft as compared to its nominal speed. The performance of the speed control operation will depend on the symmetry of the ability of the aircraft to slow down, balanced by its ability to speed up along a turn geometry to achieve desired spacing 324. In instances where the current speed of the aircraft is further from the nominal speed, less speed control authority symmetry is achievable, and thus more or less control should be allocated to turning the aircraft to achieve desired spacing 324. Performance gain factor 352 also affects the resulting flight efficiency, as the fuel burn expanded in turning the aircraft for a given speed profile is expected to be different from the fuel burn expended in a speed control operation for a given turn point geometry.

Point selector 308 is configured to select candidate turn points for evaluation by turn point evaluator 310. For example, without limitation, point selector 308 may be configured to select candidate turn point 362 from points along a current or outbound leg of the turning aircraft using Eulerian method 364.

Turn point evaluator 310 is configured to determine whether candidate turn point 362 satisfies search goal 350. Candidate turn point 362 that satisfies search goal 350 is identified as turn point 303 in turn information 302.

Information formatter 312 is configured to format turn information 302 in an appropriate manner for using turn information 302 to turn the aircraft to achieve desired spacing 324. For example, without limitation, information formatter 312 may be configured to format turn information 302 for display 370 to a human operator of the aircraft for manually turning the aircraft at turn point 303 by the human operator. Alternatively, or in addition, information formatter 312 may format turn information 302 for use by flight management system 372 or another appropriate system for automated control of the aircraft to perform a turn point 303.

Information sender 314 may be configured to send turn information 302 to an appropriate location for use in turning the aircraft. For example, without limitation, information sender 314 may be configured to send turn information 302 to a display device for display 370 or to flight management system 372 on the aircraft.

The illustrations of FIGS. 1-3 are not meant to imply physical or architectural limitations to the manner in which different illustrative embodiments may be implemented. Other components in addition to, in place of, or in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 4:
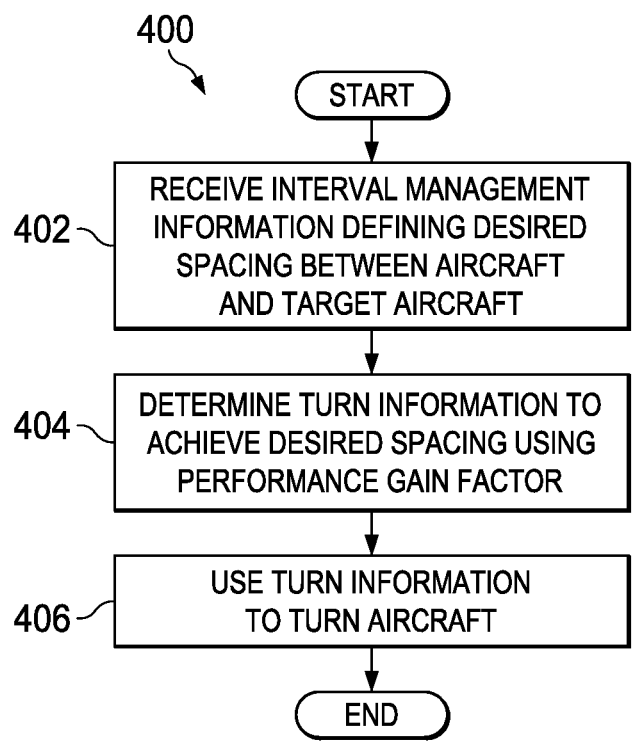
FIG. 4 is an illustration of a flowchart of a process for turning an aircraft in accordance with an illustrative embodiment.

Turning to FIG. 4, an illustration of a flowchart of a process for turning an aircraft is depicted in accordance with an illustrative embodiment. Process 400 may be an example of one implementation of a process for turning aircraft 102 in FIG. 1 or aircraft 201 in FIG. 2 for interval management. For example, without limitation, process 400 may be performed onboard aircraft 102 in FIG. 1 or aircraft 201 in FIG. 2.

Process 400 may begin with receiving interval management information defining a desired spacing between the aircraft and a target aircraft (operation 402). For example, without limitation, the interval management information may be received onboard the aircraft from an air traffic control system or other appropriate source of interval management information via an appropriate communications system onboard the aircraft. The interval management information may be received onboard the aircraft in the form of digital data that is read by a turn calculator implemented in a data processing system onboard the aircraft. Alternatively, or in addition, the interval management information may be received as voice information by an operator onboard the aircraft and then entered into the turn calculator onboard the aircraft by the operator.

Turn information to achieve the desired spacing between the aircraft and the target aircraft then may be determined using a performance gain factor (operation 404). The turn information may identify a turn point for the aircraft. The performance gain factor identifies a desired relationship between achieving the desired spacing between the aircraft and the target aircraft due to turning the aircraft at the turn point and due to changing the speed of the aircraft. For example, without limitation, operation 404 may be performed by a turn calculator implemented in a data processing system onboard the aircraft.

The turn information then may be used to turn the aircraft at the turn point (operation 406), with the process terminating thereafter. For example, without limitation, the turn information may be displayed in an appropriate format to a pilot or other appropriate human operator of the aircraft. The pilot or other operator may then use the turn information to turn the aircraft at the turn point. Alternatively, the turn information may be used to turn the aircraft automatically at the turn point. For example, without limitation, the turn information may be presented to the operator of the aircraft in an appropriate form and then entered manually into a flight management system for the aircraft by the operator. Alternatively, the turn information may be provided directly to the flight management system for the aircraft in an appropriate form for use by the flight management system.

Figure 5:
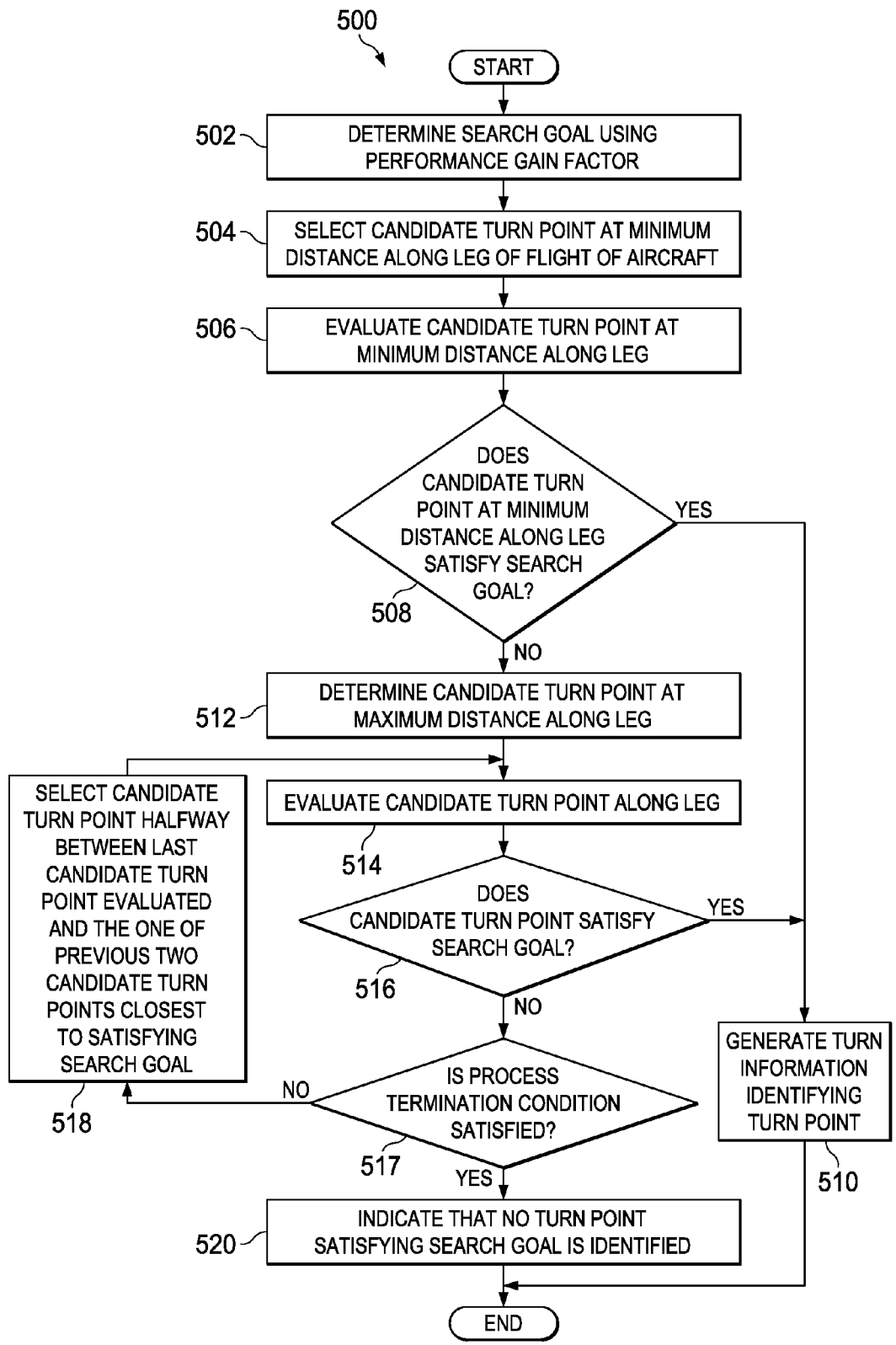
FIG. 5 is an illustration of a flowchart of a process for determining turn information in accordance with an illustrative embodiment.

Turning to FIG. 5, an illustration of a flowchart of a process for determining turn information is depicted in accordance with an illustrative embodiment. Process 500 may be performed to identify a turn point for turning an aircraft in flight to achieve a desired spacing between the aircraft and a target aircraft for interval management or another appropriate purpose. Process 500 may be performed, for example, by turn calculator 222 in FIG. 2 or by turn calculator 300 in FIG. 3. Process 500 may be an example of one implementation of operation 404 in FIG. 4.

Process 500 may begin with determining a search goal using a performance gain factor (operation 502). The performance gain factor used in operation 502 may identify a desired portion of achieving a desired spacing between an aircraft and a target aircraft due to turning the aircraft at a turn point and a desired portion of achieving the desired spacing between the aircraft and the target aircraft due to changing speed of the aircraft. For example, without limitation, the search goal may be based on the desired spacing between the aircraft and the target aircraft multiplied by the performance gain factor.

A candidate turn point at a minimum distance from the current location of the aircraft along the current leg of flight of the aircraft may then be selected (operation 504). The minimum distance along the current leg selected in operation 504 is the closest point to the current location of the aircraft along the current leg of the flight at which the turn to achieve the desired spacing between the aircraft and the target aircraft may occur. Any appropriate value may be selected for the minimum distance used in operation 504. For example, without limitation, the minimum distance along the current leg of the flight may be selected to be approximately 5 nautical miles, or any other appropriate distance.

The candidate turn point at the minimum distance along the current leg of the flight is then evaluated (operation 506). The evaluation of operation 504 may include determining whether turning the aircraft at the candidate turn point at the minimum distance along the current leg satisfies the search goal (operation 508). If turning the aircraft at the candidate turn point at the minimum distance along the current leg does satisfy the search goal determined in operation 502, then turn information may be generated identifying the candidate turn point at the minimum distance along the leg as the turn point (operation 510), with the process terminating thereafter.

When it is determined at operation 508 that turning the aircraft at the candidate turn point at the minimum distance along the current leg does not satisfy the search goal, a candidate turn point at a maximum distance from the current location of the aircraft along the current leg of flight of the aircraft may then be determined (operation 512). The maximum distance along the current leg determined in operation 512 is the furthest point from the current location of the aircraft along the current leg of the flight at which the turn to achieve the desired spacing between the aircraft and the target aircraft may occur. The maximum distance along the leg may be determined based on the maximum turn angle of the aircraft. An example of one implementation of a process for determining the maximum distance in operation 512 is described below with reference to FIG. 7.

The candidate turn point at the maximum distance along the current leg of the flight is then evaluated (operation 514). The evaluation of operation 514 may include determining whether turning the aircraft at the candidate turn point at the maximum distance along the current leg satisfies the search goal (operation 516). If turning the aircraft at the candidate turn point at the maximum distance along the current leg does satisfy the search goal determined in operation 502, then turn information may be generated at operation 510 identifying the candidate turn point at the maximum distance along the leg as the turn point, with the process terminating thereafter.

When it is determined at operation 516 that turning the aircraft at the candidate turn point at the maximum distance along the current leg does not satisfy the search goal, it may be determined whether a process termination condition is satisfied (operation 517). In response to a determination that the process termination condition is not satisfied, a point halfway between the last candidate turn point evaluated and the one of the previous two candidate turn points that was determined to be closest to satisfying the search goal is selected (operation 518). Operation 518 implements an Eulerian method of selecting candidate turn points to evaluate as turn points for the aircraft. The candidate turn point selected in operation 518 is then evaluated at operation 514 to determine whether turning the aircraft at the candidate turn point satisfies the search goal at operation 516. If turning the aircraft at the candidate turn point selected in operation 518 does satisfy the search goal determined in operation 502, then turn information may be generated at operation 510 identifying the candidate turn point selected in operation 518 as the turn point, with the process terminating thereafter. When it is determined at operation 516 that turning the aircraft at the candidate turn point selected in operation 518 does not satisfy the search goal, the process may proceed to operation 517 to determine whether the process termination condition is satisfied.

In response to a determination at operation 517 that the process termination condition is satisfied, it may be indicated that no turn point satisfying the search goal is identified (operation 520), with the process terminating thereafter. The process termination condition used in operation 517 may be selected to prevent a perpetual loop condition in process 500 when a turn point that satisfies the search goal is not identified within a reasonable amount of time or a reasonable number of iterations.

Figure 6:
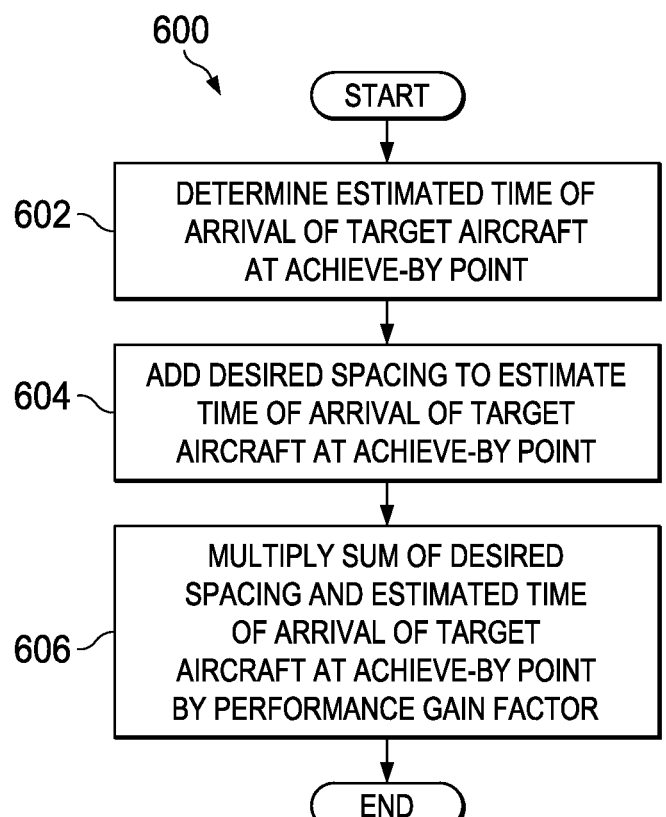
FIG. 6 is an illustration of a flowchart of a process for determining a search goal using a performance gain factor in accordance with an illustrative embodiment.

Turning to FIG. 6, an illustration of a flowchart of a process for determining a search goal using a performance gain factor is depicted in accordance with an illustrative embodiment. Process 600 may be performed, for example, by search goal determiner 306 in FIG. 3. Process 600 may be an example of one implementation of operation 502 in FIG. 5.

Process 600 may begin with determining the estimated time of arrival of the target aircraft at the achieve-by point (operation 602). For example, without limitation, operation 602 may be performed by a trajectory generator using the intended flight path for the target aircraft, target aircraft information identifying the current state of operation of the target aircraft, and the achieve-by point.

The desired spacing then may be added to the estimated time of arrival of the target aircraft at the achieve-by point (operation 604). The desired spacing used in operation 604 is represented in units of time. If the desired spacing is provided as a distance, it may be transformed onto a time-based representation for use in operation 604. For example, without limitation, a desired spacing provided as a distance may be transformed to a time-based representation based on the estimated ground speed of the target aircraft through the achieve-by point. The estimated ground speed of the target aircraft through the achieve-by point may be provided by the trajectory generator based on the intended flight path for the target aircraft.

The search goal then may be determined by multiplying the sum of the desired spacing and the estimated time of arrival of the target aircraft at the achieve-by point by the performance gain factor (operation 606), with the process terminating thereafter. The search goal thus may be determined using the equation:

$$SG = (ABP\_ETA_t + DS) * PGF \qquad (1)$$

where SG is the search goal, $ABP\_ETA_t$ is the estimated time of arrival of the target aircraft at the achieve-by point, DS is the desired spacing, and PGF is the performance gain factor.

In this example, the performance gain factor may be selected as a value that essentially partitions the amount of time to achieve the desired spacing between turning the aircraft at the turn point and changing the speed of the aircraft. For example, without limitation, in this case a performance gain factor value of 1.0 will result in determining turn information defining a turn point that yields exactly the desired spacing without changing the speed of the aircraft. In this example, a performance gain factor value of 0.8 will result in determining turn information that defines a turn point that achieves 80 percent of the desired spacing, with approximately 20 percent of the desired spacing remaining to be achieved by changing the speed of the aircraft.

Figure 7:
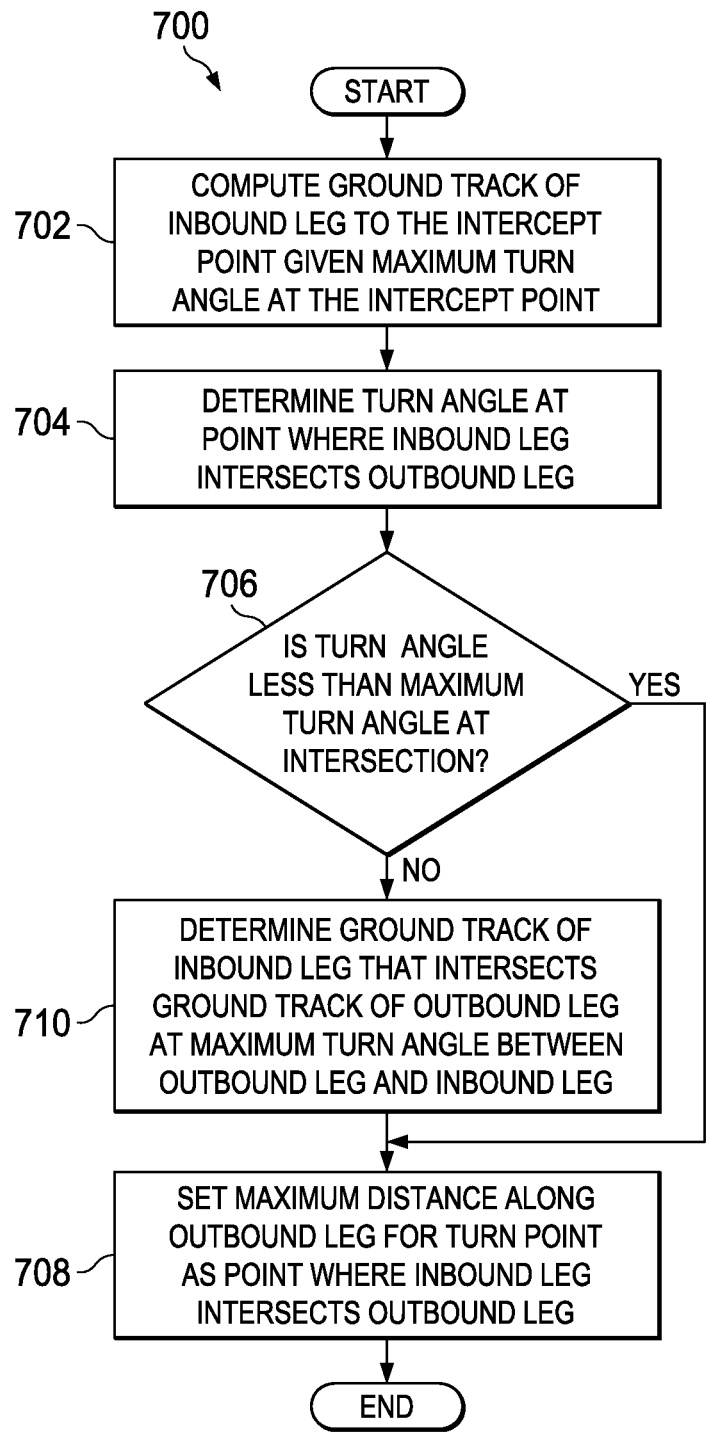
FIG. 7 is an illustration of a flowchart of a process for determining a maximum distance along a leg for a turn point in accordance with an illustrative embodiment.

Turning to FIG. 7, an illustration of a flowchart of a process for determining a maximum distance along a leg for a turn point is depicted in accordance with an illustrative embodiment. Process 700 may be determined, for example, by point selector 308 in FIG. 3. Process 700 may be an example of one implementation of operation 512 in process 500 in FIG. 5.

Process 700 may begin with computing the ground track of an inbound leg to the intercept point given the maximum turn angle for the aircraft the intercept point (operation 702). For example, without limitation, the maximum turn angle at the intercept point may be approximately 120 degrees or another appropriate angle. The turn angle at the point where the inbound leg determined in operation 702 intersects the outbound leg of the flight then is determined (operation 704). It then may be determined whether the turn angle at the intersection between the inbound leg and the outbound leg determined in operation 704 is less than a maximum turn angle for the aircraft (operation 706). For example, without limitation, the maximum turn angle at the intersection between the outbound leg and the inbound leg may be approximately 120 degrees or another appropriate angle.

When it is determined at operation 706 that the angle between the outbound leg and the inbound leg determined in operation 702 is less than the maximum turn angle, then the maximum distance along the outbound leg for the turn point may be set as the point where the inbound leg determined in operation 702 intersects the outbound leg (operation 708), with the process terminating thereafter. Otherwise, the ground track of an inbound leg that intersects the ground track of the outbound leg at the maximum turn angle between the outbound leg and the inbound leg may be determined (operation 710). The maximum distance along the outbound leg for the turn point then may be set at operation 708 as the point where the inbound leg determined in operation 710 intersects the outbound leg, with the process terminating thereafter.

Figure 8:
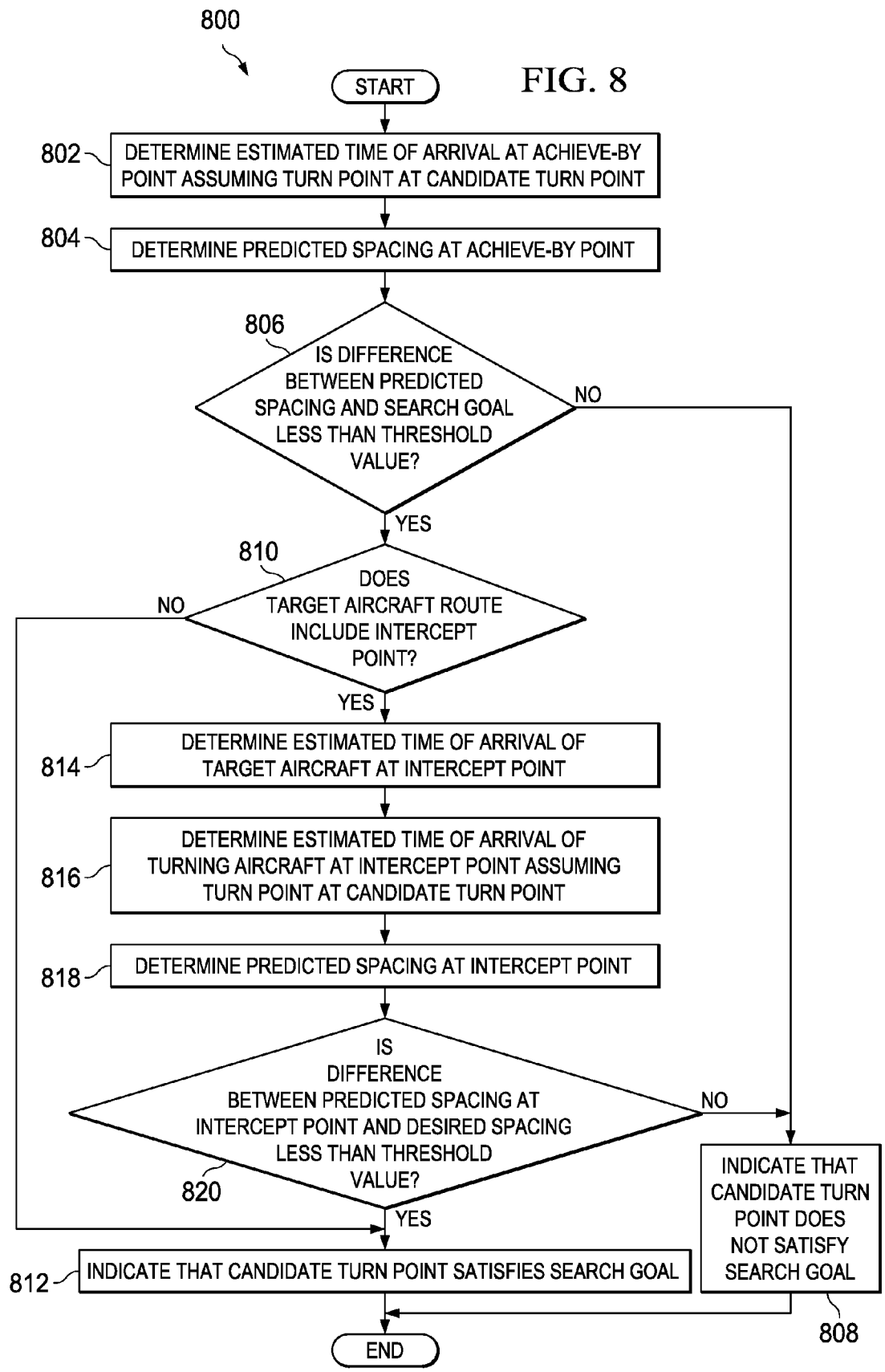
FIG. 8 is an illustration of a flowchart of a process for evaluating a candidate turn point in accordance with an illustrative embodiment.

Turning to FIG. 8, an illustration of a flowchart of a process for evaluating a candidate turn point is depicted in accordance with an illustrative embodiment. Process 800 may be performed, for example, by turn point evaluator 310 in FIG. 3. Process 800 may be an example of one implementation of operations 508 and 516 in process 500 in FIG. 5.

Process 800 may begin by determining an estimated time of arrival at an achieve-by point assuming a turn point for the aircraft at the candidate turn point being evaluated (operation 802). For example, without limitation, the estimated time of arrival at the achieve-by point may be determined using a trajectory generator to predict the movement of the aircraft using aircraft state information and assuming a flight path with a turn at the candidate turn point. Using the estimated time of arrival determined in operation 802, a predicted spacing between the aircraft and the target aircraft at the achieve-by point then may be determined (operation 804). It then may be determined whether the difference between the predicted spacing and the search goal is less than a selected threshold value (operation 806). Any appropriate value may be selected for the threshold value used in operation 806. For example, without limitation, the threshold value may be selected to be approximately 10 seconds, or any other appropriate value. If the difference between the achieved spacing and the search goal is not less than the selected threshold value, it may be indicated that the candidate turn point under evaluation does not satisfy the search goal (operation 808), with the process terminating thereafter.

Depending on the difference in assumed speed profiles between the turning aircraft and the target aircraft in the portion of the flight path between the intercept point and the achieve-by-point, it may be possible to identify a turn point for the aircraft that will achieve the desired spacing at the achieve-by-point but not at the intercept point. Also, depending on the value of the performance gain factor and whether or not there is a speed constraint for the aircraft at the intercept point, the speed of the turning aircraft at the intercept point may be different from the speed of the target aircraft at the intercept point. In such cases, it may be preferable to evaluate the estimated spacing at the intercept point resulting from a turn at the point under evaluation, and reject the point as the turn point for the aircraft if the estimated spacing between the aircraft at the intercept point would be significantly different from the desired spacing.

Therefore, when it is determined at operation 806 that the difference between the achieved spacing and the search goal is less than the selected threshold value, it may be determined whether the target aircraft route includes the intercept point (operation 810). If the target aircraft route does not include the intercept point, then it may be indicated that the candidate turn point under evaluation satisfies the search goal (operation 812), with the process terminating thereafter.

When it is determined at operation 810 that the target aircraft route does include the intercept point, an estimated time of arrival of the target aircraft at the intercept point may be determined (operation 814). The estimated time of arrival of the turning aircraft at the intercept point is determined assuming a turn point for the aircraft at the candidate turn point being evaluated (operation 816). Using the estimated times of arrival determined in operations 814 and 816, a predicted spacing between the turning aircraft and the target aircraft at the intercept point then may be determined (operation 818).

It then may be determined whether the difference between the predicted spacing at the intercept point and the desired spacing is less than a selected threshold value (operation 820). Any appropriate value may be selected for the threshold value used in operation 820. The threshold value used in operation 820 preferably may be the same as the threshold value used in operation 806. Alternatively, the threshold value used in operation 820 may be different from the threshold value used in operation 806. For example, without limitation, the threshold value used in operation 820 may be selected to be approximately 10 seconds, or any other appropriate value. If the difference between the achieved spacing at the intercept point and the desired spacing is not less than the selected threshold value, it may be indicated at operation 808 that the candidate turn point under evaluation does not satisfy the search goal, with the process terminating thereafter. Otherwise it may be indicated at operation 812 that the candidate turn point under evaluation satisfies the search goal, with the process terminating thereafter.

Figure 9:
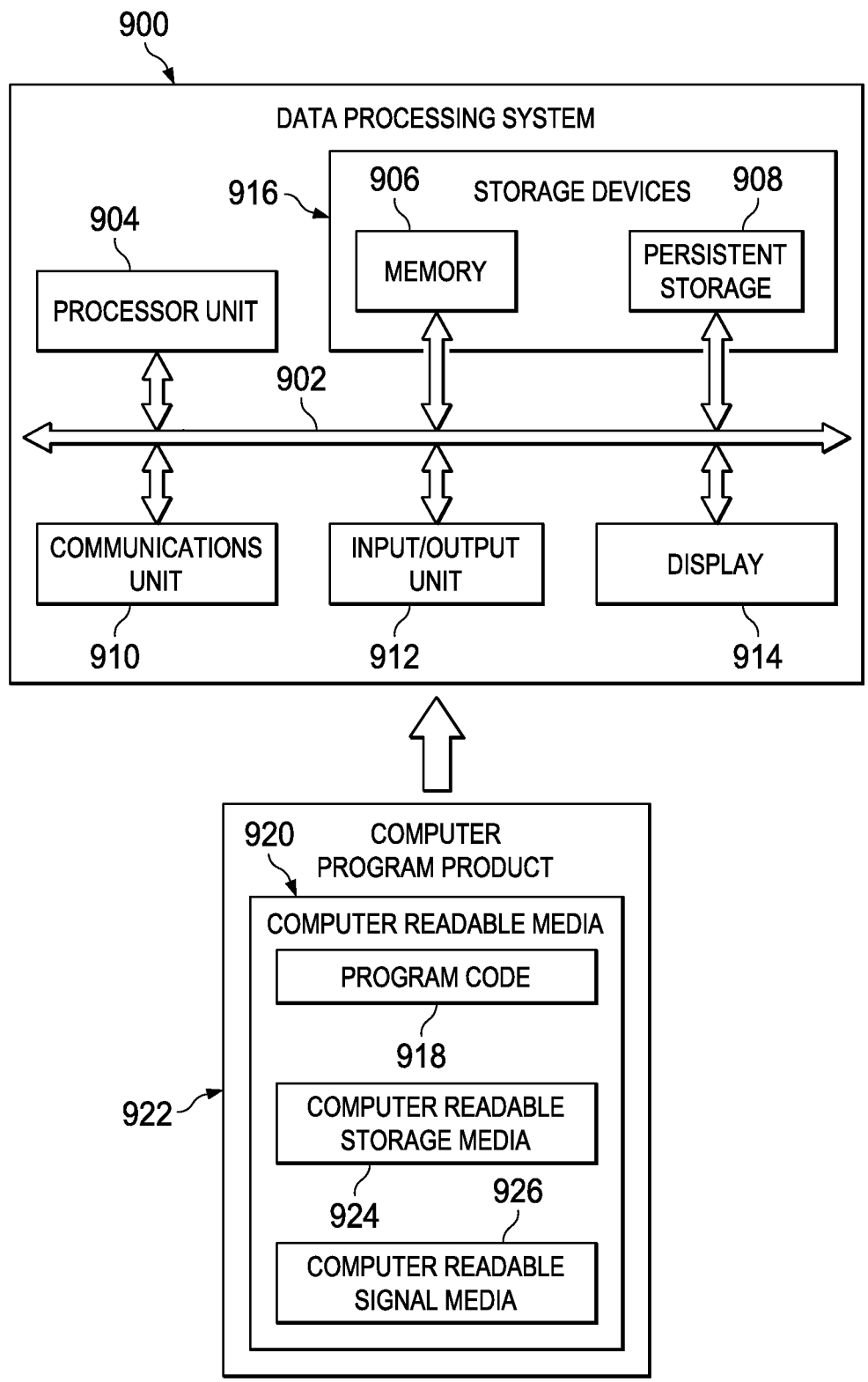
FIG. 9 is an illustration of a block diagram of a data processing system in accordance with an illustrative embodiment.

Turning to FIG. 9, an illustration of a block diagram of a data processing system is depicted in accordance with an illustrative embodiment. Data processing system 900 may be an example of one implementation of aircraft data processing system 240 in FIG. 1. Data processing system 900 may be an example of one implementation of a data processing system on which turn calculator 222 in FIG. 2 or turn calculator 300 in FIG. 3 is implemented.

In this illustrative example, data processing system 900 includes communications fabric 902. Communications fabric 902 provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or transmit and receive data. Communications unit 910 may be, for example, a modem or a network adapter, two network adapters, or some combination thereof. Further, a memory may be, for example, memory 906, or a cache, such as found in an interface and memory controller hub that may be present in communications fabric 902.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of turning an aircraft for interval management, comprising:
   receiving interval management information identifying a desired spacing between the aircraft and a target aircraft;
   determining turn information using a performance gain factor, wherein the turn information identifies a turn point for the aircraft and the performance gain factor identifies a desired portion of achieving the desired spacing due to turning the aircraft at the turn point and a desired portion of achieving the desired spacing due to changing speed of the aircraft; wherein determining the turn information comprises:
      determining a search goal using the performance gain factor;
      selecting a candidate turn point along a leg of flight of the aircraft;
      evaluating the candidate turn point to determine whether the candidate turn point satisfies the search goal; and
      identifying the candidate turn point as the turn point in response to a determination that the candidate turn point satisfies the search goal; and
   using the turn information to turn the aircraft at the turn point.

2. The method of claim 1, wherein the performance gain factor identifies a desired portion of a time for achieving the desired spacing between the aircraft and the target aircraft due to turning the aircraft at the turn point and a desired portion of the time for achieving the desired spacing due to changing speed of the aircraft.

3. The method of claim 1, wherein determining the search goal comprises:
   determining an estimated time of arrival of the target aircraft at an achieve-by point; and
   multiplying a sum of the desired spacing and the estimated time of arrival of the target aircraft at the achieve-by point by the performance gain factor.

4. The method of claim 1, wherein selecting the candidate turn point along the leg of flight of the aircraft comprises:
selecting a first candidate turn point at a minimum distance from a current position of the aircraft along the leg of flight of the aircraft;
determining a second candidate turn point at a maximum distance from the current position of the aircraft along the leg of flight of the aircraft using a maximum turn angle for the aircraft; and
selecting the candidate turn point along the leg of flight of the aircraft between the first candidate turn point and the second candidate turn point.

5. The method of claim 1, wherein selecting the candidate turn point along the leg of flight of the aircraft comprises using an Eulerian method to select the candidate turn point.

6. The method of claim 1, wherein evaluating the candidate turn point comprises:
determining a first predicted spacing between the aircraft and the target aircraft at an achieve-by point assuming that the aircraft turns at the candidate turn point; and
determining that the candidate turn point satisfies the search goal in response to a determination that a difference between the first predicted spacing and the search goal is less than a first threshold value.

7. The method of claim 6, wherein evaluating the candidate turn point further comprises:
determining a second predicted spacing between the aircraft and the target aircraft at an intercept point assuming that the aircraft turns at the candidate turn point; and
determining that the candidate turn point satisfies the search goal in response to a determination that a difference between the second predicted spacing and the desired spacing is less than a second threshold value.

8. The method of claim 1, wherein using the turn information to turn the aircraft at the turn point comprises at least one of:
displaying the turn information to an operator of the aircraft for manually turning the aircraft by the operator using the turn information;
manually entering the turn information into a flight management system for the aircraft; and
automatically providing the turn information to the flight management system in a format for use by the flight management system to turn the aircraft by the flight management system.

9. An apparatus, comprising:
a processor configured to implement:
an information receiver configured to receive interval management information identifying a desired spacing between an aircraft and a target aircraft;
a turn calculator configured to determine turn information using a performance gain factor, wherein the turn information identifies a turn point for the aircraft and the performance gain factor identifies a desired portion of achieving the desired spacing due to turning the aircraft at the turn point and a desired portion of achieving the desired spacing due to changing speed of the aircraft, and wherein the turn calculator comprises:
a search goal determiner configured to determine a search goal using the performance gain factor;
a point selector configured to select a candidate turn point along a leg of flight of the aircraft; and
a turn point evaluator configured to evaluate the candidate turn point to determine whether the candidate turn point satisfies the search goal and to identify the candidate turn point as the turn point in response to a determination that the candidate turn point satisfies the search goal; and
an information formatter configured to format the turn information for using the turn information to turn the aircraft at the turn point.

10. The apparatus of claim 9, wherein the performance gain factor identifies a desired portion of a time for achieving the desired spacing between the aircraft and the target aircraft due to turning the aircraft at the turn point and a desired portion of the time for achieving the desired spacing due to changing speed of the aircraft.

11. The apparatus of claim 9, wherein the search goal determiner is configured to:
determine an estimated time of arrival of the target aircraft at an achieve-by point; and
multiply a sum of the desired spacing and the estimated time of arrival of the target aircraft at the achieve-by point by the performance gain factor to determine the search goal.

12. The apparatus of claim 9, wherein the point selector is configured to:
select a first candidate turn point at a minimum distance from a current position of the aircraft along the leg of flight of the aircraft;
determine a second candidate turn point at a maximum distance from the current position of the aircraft along the leg of flight of the aircraft using a maximum turn angle for the aircraft; and
select the candidate turn point along the leg of flight of the aircraft between the first candidate turn point and the second candidate turn point.

13. The apparatus of claim 9, wherein the point selector is configured to use an Eulerian method to select the candidate turn point along the leg of flight of the aircraft.

14. The apparatus of claim 9, wherein the turn point evaluator is configured to:
determine a first predicted spacing between the aircraft and the target aircraft at an achieve-by point assuming that the aircraft turns at the candidate turn point; and
determine that the candidate turn point satisfies the search goal in response to a determination that a difference between the first predicted spacing and the search goal is less than a first threshold value.

15. The apparatus of claim 14, wherein the turn point evaluator is further configured to:
determine a second predicted spacing between the aircraft and the target aircraft at an intercept point assuming that the aircraft turns at the candidate turn point; and
determine that the candidate turn point satisfies the search goal in response to a determination that a difference between the second predicted spacing and the desired spacing is less than a second threshold value.

16. The apparatus of claim 9, wherein the information formatter is configured to format the turn information for at least one of:
displaying the turn information to an operator of the aircraft for manually turning the aircraft at the turn point by the operator; and
using the turn information by a flight management system on the aircraft to turn the aircraft at the turn point by the flight management system.

17. A method of turning an aircraft for interval management, comprising:
determining a search goal using a desired spacing between the aircraft and a target aircraft, wherein the search goal uses a performance gain factor, wherein the performance gain factor identifies a desired portion of achieving the desired spacing between the aircraft and the target aircraft due to turning the aircraft at the turn point and a desired portion of achieving the desired spacing due to changing speed of the aircraft;

selecting a candidate turn point along a leg of flight of the aircraft;

evaluating the candidate turn point to determine whether the candidate turn point satisfies the search goal;

identifying the candidate turn point as a turn point for the aircraft in response to a determination that the candidate turn point satisfies the search goal; and turning the aircraft at the turn point.

* * * * *